3,384,630
BUTADIENE POLYMERIZATION AND
CATALYSTS THEREFOR
Kouei Komatsu, Shigeyuki Nishiyama, Hidetoshi Yasunaga, and Kenichi Ueda, Yokkaichi-shi, Japan, assignors to Japan Synthetic Rubber Co., Ltd., Tokyo, Japan, a corporation of Japan
No Drawing. Filed Apr. 22, 1965, Ser. No. 450,184
Claims priority, application Japan, June 11, 1964, 39/32,908
7 Claims. (Cl. 260—94.3)

ABSTRACT OF THE DISCLOSURE

A process for producing polybutadiene having a high percentage of cis-1,4 configuration by contacting butadiene in the presence of a hydrocarbon solvent with a catalyst consisting of a reaction mixture of (1) a compound selected from the group consisting of iron, cobalt and nickel peroxides, 1 gram of which contains more than 0.1 milligram equivalent of active oxygen capable of oxidizing potassium iodide at room temperature, and (2) a halide of aluminum.

---

This invention relates to a method for polymerizing butadiene with a novel polymerization catalyst. More particularly it relates to a method for producing polybutadiene having a substantially all cis-1,4 configuration, and to polybutadiene produced thereby.

The mechanical, physical and other properties of the vulcanized product of cis-1,4 polybutadiene having a substantially all cis-1,4 configuration have proved for the last several years that cis-1,4 polybutadiene having a substantially all, cis-1,4 configuration is superior as a general purpose rubber, which has increased the demand for the rubber in the world.

It has been heretofore known that cis-1,4 polybutadiene can be produced by contacting butadiene in the presence of a non-aqueous medium with a catalyst such as (1) a reaction mixture of a salt of a metal of Group VIII of the Periodic Table and an organometallic compound, particularly an organometallic halogen compound of a metal of the Groups I, II and III, (2) a reaction mixture of a salt of a metal of Group VIII an organometallic compound of a metal of Groups I, II and III and a Lewis acid, and (3) a reaction mixture of an organometallic compound of a metal of Groups I, II and III and a Lewis acid.

All of the above-mentioned catalytic systems are so-called Ziegler type catalysts, which contain, as one component, an organometallic compound. As is well known, since organometallic compounds react violently with oxygen or moisture in the air, their handling is very difficult, and even when they are stored under an inert gas atmosphere, they deteriorate by reacting with a trace of oxygen or moisture. Such deterioration of an organometallic compound during the storage thereof results in poor reproducibility of polymerization velocity and of molecular weight and other various properties of the polymer so produced.

Furthermore, organometallic compounds are expensive, which is another disadvantage of these methods.

There has been known a method for polymerizing conjugated dienes, particularly butadiene, with a catalyst containing no organometallic compound (Japanese patent publication 9443/63). The catalyst used in this method is a three-component catalyst consisting of (a) at least one metal or anhydrous compound of a divalent transition metal such as cobalt, nickel, chromium, iron, manganese, palladium and platinum, (b) anhydrous aluminum halide and (c) a proton acceptor. According to this method a temperature of higher than 100° C. is required for the preparation of the catalyst. The polymerization velocity of this method is low, more than 15 hours being required.

An object of the present invention is to provide a method for producing polybutadiene, especially cis-1,4 polybutadiene with a catalyst containing no organometallic compound, said catalyst being easily preparable and having a high polymerization activity.

This and other objects can be attained by the present invention which comprises contacting butadiene in the presence of a hydrocarbon solvent with a catalyst consisting of a reaction mixture of (1) a peroxide of a metal of the Group VIII of the Periodic Table, said peroxide containing more than 0.1 milligram equivalent of active oxygen capable of oxidizing potassium iodide at room temperature per gram of peroxide, and (2) a halide of aluminum.

Among the peroxides of metals of Group VIII, one component of the catalyst of the present invention, those of nickel, cobalt and iron are preferable. Though the microstructure of these metal peroxides has not been perfectly clarified, it is certain that the metals of these peroxides have a higher valency than usual: it has been reported in "Progress in Inorganic Chemistry" (vol. 2, page 131) by F. Albert Cotton, published by Interscience Publishers, Inc. in 1962, that metal peroxides having higher valency such as $NiO_2 \cdot H_2O$, $CoO_2 \cdot H_2O$ and $FeO_2 \cdot H_2O$ can be obtained through a method similar to that used in this invention which will be described in detail hereinafter.

Generally, an oxidized state of a metal salt can be determined by iodometry, which comprises contacting potassium iodide with the metal salt in an acidic aqueous solution and quantitatively determining the free iodine.

The salts of divalent metals of Group VIII, e.g. nickel chloride, cobaltous chloride, ferrous chloride, nickel sulfate, cobaltous sulfate, ferrous sulfate, nickel oxide, cobalt oxide, iron oxide or the like do not liberate free iodine at room temperature. On the other hand the peroxides used in the present invention contain more than 0.1 milligram equivalent of active oxygen capable of liberating free iodine per gram of said peroxide.

These peroxides containing active oxygen are stable compounds which neither ignite nor burn at all in the air. When stored in moisture-free air they do not lose active oxygen for a long time, more than one month.

The method of the present invention is characterized by the polymerization of butadiene with a reaction mixture of a peroxide of a metal of Group VIII and aluminum halide particularly aluminum-chloride, -bromide and -iodide. Therefore the catalytic system of the present invention is substantially different from conventional catalyst systems which contain an organometallic compound.

In the present invention, it is believed that the higher valency of the metal of the peroxide is reduced to a lower state by the aluminum halide. When the peroxide and the aluminum halide are contacted in a hydrocarbon solvent, the characteristic color of a salt of a divalent metal of Group VIII appears and the color gradually changes to dark red, the characteristic color of the metal in a lower valency.

The preparation of the catalyst is simple. Usually the catalyst can be prepared at a temperature lower than 100° C., even at room temperature. Its polymerization activity is very high and 0.5 to 5 hours is a sufficient time for the polymerization.

Since the peroxide of metals of Group VIII can be produced readily by the method hereinafter described, and aluminum halide can be obtained at an inexpensive price, the catalyst of the present invention can be prepared easily and economically on a commercial scale.

The solvent used in the preparation of the catalyst and in the polymerization of butadiene is an aromatic, aliphatic or alicyclic-hydrocarbon.

Among the above-mentioned hydrocarbons, those which are liquid at room temperature are preferable. Examples are benzene, toluene, pentane, hexane, heptane, octane, nonane, decane, cyclohexane, cycloheptane and the like. A mixture of these hydrocarbons, e.g. petroleum ether can also be used for the solvent.

The method for preparing the catalyst of the present invention is given below:

The peroxide of a metal of Group VIII which contains more than 0.1 milligram equivalent of active oxygen capable of oxidizing potassium iodide at room temperature per gram of peroxide may be produced by a method such as: (1) a method in which a salt of a metal of Group VIII having an ordinary valency (mostly divalent) is brought into contact with a powerful oxidizing agent such as hydrogen peroxide, sodium hypochlorite or the like in an aqueous solution, (2) a method in which a salt of a metal of Group VIII having an ordinary valency (mostly divalent) is brought into contact with an oxidizing agent such as oxygen, ozone or the like in liquid ammonia, or (3) a method in which a metal of Group VIII, its oxide or hydroxide is oxidized by a powerful oxidizing agent such as oxygen, ozone, nitric acid or the like. Among these three methods, the first method is preferable.

An example of the method (1) is given below:

Into an aqueous solution of crystalline nickel sulfate is dropped, under vigorous agitation, an alkaline aqueous solution of sodium hypochlorite in an amount of one half of the nickel sulfate (mol ratio), whereby black nickel peroxide is readily formed. The resulting precipitate is washed with water and dried in vacuo, whereupon black powdery nickel peroxide is obtained. This substance is amorphous in nature as determined by X-ray diffraction and shows properties different from those of crystalline nickel (II) oxide.

In the determination of active oxygen by iodometry in acidic aqueous solution, a starch indicator can be used in the titration of liberated iodine with sodium thiosulfate but more precise determination is possible by potentiometric titration employing a potentiograph.

The determination of the active oxygen of the peroxide of the present invention was carried out by potentiometric titration.

As for nickel compounds capable of forming such nickel peroxides when contacted with sodium hypochlorite or hydrogen peroxide, such divalent nickel salts as nickel sulfate, nickel chloride, nickel bromide, nickel iodide, nickel hydroxide and the like are preferable.

In producing cobalt peroxides by the method (1), such divalent or trivalent cobalt salts as cobaltous sulfate, cobaltic sulfate, cobaltous chloride, cobaltic chloride, cobaltous bromide, cobaltic bromide, cobaltous iodide, cobaltic iodide and cobaltic hydroxide are preferable.

Iron peroxides can be produced from the sulfate, chloride, bromide, iodide and the like as in the case of nickel or cobalt peroxides. In the case of iron, the secondary salts are preferred to the primary salts.

These peroxides can likewise be produced by the methods (2) and (3) mentioned above.

The catalyst is prepared by bringing aluminum halide into contact with the peroxide of a metal of the Group VIII at a temperature ranging from 0° C. to 150° C. preferably from 25° C. to 100° C. in the presence of a hydrocarbon solvent which is liquid at room temperature in a nitrogen atmosphere.

The time for contacting the two components can be varied from several minutes to more than 50 hours depending on the temperature, the composition of the two components and other conditions.

In the solvent, the peroxide is not dissolved, but suspended in the form of fine solid particles. The aluminum halide, of which a slight amount is dissolved, is mostly suspended in the solvent as fine solid particles. The reaction of the two components is initiated by the contact of the dissolved aluminum halide with the suspended peroxide particles, and as the reaction proceeds, the solid phase is reduced. When an aliphatic hydrocarbon such as n-hexane, n-butane or the like is used for the solvent, as the reaction proceeds, the solid phase is reduced and an oily reaction product is formed. When an aromatic or alicyclic hydrocarbon such as benzene, toluene, cyclohexane or the like is used, such an oily reaction product is not formed, but the separation of the oily substance is observed when the solution is concentrated.

There is no doubt that the above-mentioned oily substance plays an important role in the activity of the catalyst as illustrated in Example 12.

The color of the catalytic system turns, as the reaction proceeds, first to the color characteristic of the divalent state of the peroxide metal, and then to dark red. For example when nickel peroxide is used, the color of the catalytic system turns, as the reaction proceeds, to yellowish red, to yellowish green, and then to dark red. The catalyst is most effective when the solution is dark red.

The polymerization method of the present invention is given below:

The polymerization is carried out in an inert atmosphere. The solvent of aliphatic, aromatic or alicyclic hydrocarbon or of a mixture thereof is used in an amount of 0.5 to 50 parts by volume per part of monomer. The polymerization temperature is between −30° C. and 150° C., preferably between 0° C. and 100° C.

The amount of each catalyst component relative to the monomer can be varied over a wide range depending on the temperature and contacting time of the catalyst preparation, polymerization time, amount of solvent used relative to the monomer and on other various polymerization conditions. It also varies depending upon the total volume of the polymerization system.

Since the catalyst of the present invention is substantially soluble, the polymerization can be carried out not only by a batch process but also by a continuous process. There is no special limit regarding the polymerization pressure.

During the progress of polymerization, the reaction system increases in viscosity. The polymerization is discontinued by adding water, alcohol, acetone or the like to the polymerization system.

The polymers can be prevented from aging and gelatinizing by adding an antioxidant when the polymerization is stopped.

The resulting polybutadiene is coagulated by adding a poor solvent such as alcohol to the polymerization system, or by removing the polymerization solvent through steam distillation, and then dried as usual.

The catalyst residue which remains in the coagulated polymer, can be removed by admixing diluted hydrochloric acid or nitric acid to the polymerization stopper. But such catalyst residue is so slight in amount that it is usually unnecessary to remove it.

Polybutadiene obtained by the present invention has high molecular weight, and especially, the polybutadiene produced with a catalyst consisting of nickel peroxide and aluminum halide has a substantially all cis-1,4 configuration.

This polymer can be used as a general purpose rubber in various fields as natural rubber and as a styrene-butadiene rubber.

The following examples are given to illustrate the present invention but it will be understood that the examples are merely illustrative and not intended to limit the scope of the invention.

The infra-red spectra analysis of catalysts and polymers was carried out with a Model 21 infra-red spectrometer of the Perkin-Elmer Company. The microstructures were analysed by the D Morero Method (Chimicà e l'Industria, 91, No. 8 (1959), p. 758).

Example 1

26.60 grams of toluene sufficiently dried by distillation in the presence of metallic sodium was introduced into a 100 milliliter pressure-resistant reaction vessel with a syringe from the top under nitrogen gas atmosphere from which oxygen and moisture were completely eliminated by passing it through anhydrous calcium chloride, molecular sieves and then triethyl aluminum (0.5 percent by weight tetraline solution).

Then 0.385 gram of anhydrous aluminum chloride sufficiently purified by sublimation and 0.032 gram of nickel peroxide were introduced into the reaction vessel under nitrogen gas atmosphere.

The nickel peroxide had been produced by the method disclosed hereinbefore from 130 grams of crystalline nickel sulfate, 300 milliliters of 6 percent sodium hypochlorite aqueous solution and 42 grams of sodium hydroxide. It was confirmed by potentiometry that 1 gram of the nickel peroxide contained $2.4152 \times 10^{-3}$ gram equivalents of active oxygen.

After being charged with toluene, aluminum chloride, and nickel peroxide, the top of the pressure-resistant reaction vessel was sealed with a crown cap having butyl rubber packing under nitrogen gas atmosphere. The reaction vessel was placed in a thermostat of 60° C.±0.1° C., and then was revolved in it for 60 minutes. With the progress of reaction, solid nickel peroxide and solid aluminum chloride in the reaction system practically disappeared and oily product began to precipitate. The color of the reaction system, which was at first pale red, became slightly yellowish green and then finally dark red.

Then the reaction vessel was taken out of the thermostat. The crown cap was removed therefrom under nitrogen gas atmosphere and the reaction vessel was immersed in a cold bath of −78° C. 6.65 grams of butadiene which had been purified by being passed through aqueous solution of potassium hydroxide, calcium chloride, granular potassium hydroxide, and then molecular sieves, was introduced into the reaction vessel by distillation. The top of the reaction vessel was sealed under nitrogen gas atmosphere.

The reaction vessel was placed and revolved in a large thermostat of 40° C.±0.1° C. and polymerization was started.

After two hours, methanol containing 1.0 percent by weight of phenyl-beta-naphthylamine was poured into the reaction vessel to precipitate polymer. The precipitated polymer was dried in vacuo for 3 days.

The yield of the resulting rubbery polymer was 6.48 grams. The polymer had a microstructure of 88.0 percent of cis-1,4, 7.5 percent of trans-1,4, 4.5 percent of vinyl.

Example 2

Instead of aluminum chloride in Example 1 aluminum bromide was used in this example. The catalyst was prepared by the same method as in Example 1 except that 0.05 gram of nickel peroxide and 0.278 gram of aluminum bromide were used. Polymerization was carried out similarly, but, for 23 hours.

The yield was 3.955 grams. And the rubbery polymer had a microstructure of 64.7 percent of cis-1,4, 28.3 percent of trans-1,4 and 7.0 percent of vinyl.

Example 3

In this example aluminum iodide was used instead of aluminum chloride in Example 1.

The catalyst was prepared by the same method as in Example 1 except that 0.05 gram of nickel peroxide and 0.491 gram of aluminum iodide were used.

Polymerization was carried out by the same method as in Example 1. The yield was 6.10 grams. The resulting rubbery polymer had a microstructure of 89.4 percent of cis-1,4, 7.2 percent of trans-1,4 and 2.3 percent of vinyl.

Examples 4–9

In these examples, the catalysts were prepared by contacting 0.1 gram of nickel peroxide and 0.385 gram of aluminum chloride in 26.60 grams of toluene under the conditions shown in Table 1. The same nickel peroxide was used as in Example 1. 6.65 grams of butadiene were polymerized at 40° C. with these catalysts.

The results are shown in Table 1.

TABLE 1

| Example | Catalyst Preparation Temperature, °C. | Contacting time, min. | Polymerization time, min. | Yield, Percent | Microstructure cis-1,4, Percent | trans-1,4, Percent | Vinyl Percent |
|---|---|---|---|---|---|---|---|
| 4 | (¹) | 60 | 240 | 55.9 | 93.6 | 2.9 | 3.5 |
| 5 | (¹) | 240 | 120 | 43.2 | 91.6 | 5.3 | 8.9 |
| 6 | (¹) | 1,800 | 120 | 42.3 | | | |
| 7 | 60 | 5 | 240 | 26.3 | 94.9 | 2.8 | 2.2 |
| 8 | 60 | 180 | 120 | 48.6 | 89.9 | 4.9 | 5.1 |
| 9 | 0 | 1,800 | 1,200 | 40.1 | 86.2 | 8.1 | 5.7 |

¹ Room temperature.

Example 10

Cobalt peroxide was used in this example.

The cobalt peroxide was produced by the method disclosed hereinbefore from 130 grams of crystalline cobalt sulfate, 250 milliliters of 6 percent sodium hypochlorite aqueous solution and 45 grams of potassium hydroxide. It was confirmed by analysis that 1 gram of the cobalt peroxide contained $3.6525 \times 10^{-3}$ gram equivalents of active oxygen. 0.2 gram of cobalt peroxide and 0.385 gram of aluminum chloride were contacted at a temperature of 60° C. for 30 minutes, in 26.60 grams of toluene. 6.65 grams of butadiene was introduced into the reaction mixture and polymerized at 40° C. for 2 hours.

The yield was 21.0 percent. The resulting rubbery polymer had a microstructure of 60.8 percent of cis-1,4, 30.8 percent of trans-1,4 and 8.4 percent of vinyl.

Example 11

In this example, iron peroxide was used. The iron peroxide was produced by the method disclosed hereinbefore from 130 grams of ferric sulfate, 250 milliliters of 6 percent sodium hypochlorite aqueous solution and 45 grams of potassium hydroxide. The active oxygen content per 1 gram of the iron peroxide was $9.810 \times 10^{-4}$ gram equivalents. 0.05 gram of iron peroxide and 0.278 gram of aluminum bromide were contacted at 60° C. for 1 hour in 26.60 grams of toluene. 6.65 grams of butadiene was introduced into the reaction mixture and polymerized at 40° C. for 19 hours.

The yield of the resulting rubbery polymer was 18.0 percent. The polymer had a microstructure of 70.1 percent of cis-1,4, 21.6 percent of trans-1,4 and 8.3 percent of vinyl.

Example 12

In this example, dark red oily substance separated from the reaction mixture of nickel peroxide and aluminum chloride and the residual supernatant liquid were individually used as the catalyst.

0.5 gram of nickel peroxide, 1 gram of which had 2.4152×10⁻³ gram equivalents of active oxygen and 3.85 grams of aluminum chloride suspended in 26.6 grams of toluene were heated and refluxed for one hour at the boiling point of toluene under nitrogen gas atmosphere. With the progress of reaction, dark red oily substance was precipitated at the bottom.

This oily substance was transferred with a syringe to another pressure-resistant reaction vessel containing 26.6 grams of toluene and 6.65 grams of butadiene. Polymerization was carried out at 40° C. for 60 minutes.

The yield was 68.4 percent. The resulting rubbery polymer had a microstructure of 87.1 percent of cis-1,4, 8.2 percent of trans-1,4 and 4.7 percent of vinyl.

The residual supernatant liquid of the reaction mixture of nickel peroxide and aluminum chloride was introduced into another pressure-resistant reaction vessel and polymerized at a temperature of 40° C. for 2 hours.

The yield was 38.1 percent. The resulting rubbery polymer had a microstructure of 86.8 percent of cis-1,4, 9.6 percent of trans-1,4 and 3.7 percent of vinyl.

Example 13

In this example, several solvents other than toluene as shown in Table 2 were used for the preparation of the catalyst and the polymerization.

Aluminum chloride and nickel peroxide, 1 gram of which contains 2.4152×10⁻³ gram equivalents of active oxygen, were introduced into 26.60 grams of solvent in an amount shown in Table 2 and contacted at 60° C. for 60 minutes. Then to the resulting mixture, 6.65 grams of butadiene was introduced and polymerized at 40° C. The results are shown in Table 2.

TABLE 2

| Experiment No. | Nickel Peroxide (g.) | Aluminum Chloride, mmol. | Solvent | Polymerization Time, hr. | Yield, Percent | Microstructure | | |
|---|---|---|---|---|---|---|---|---|
| | | | | | | cis-1,4, Percent | trans-1,4, Percent | Vinyl, Percent |
| 1 | 0.050 | 1.05 | Benzene | 1.5 | 74.9 | 77.7 | 17.1 | 5.2 |
| 2 | 0.025 | 0.478 | ....do.... | 19.5 | 30.0 | 84.9 | 10.6 | 4.5 |
| 3 | 0.050 | 1.14 | m-Xylene | 2.0 | 38.6 | 83.5 | 10.2 | 6.3 |
| 4 | 0.025 | 0.476 | ....do.... | 3.5 | 40.0 | 84.4 | 11.4 | 4.3 |
| 5 | 0.050 | 1.24 | n-Heptane | 3.5 | 15.0 | 80.3 | 14.8 | 4.9 |
| 6 | 0.050 | 1.25 | Toluene-cyclohexane [1] | 3.5 | 22.4 | 76.9 | 20.0 | 3.1 |
| 7 | 0.050 | 1.32 | Toluene-petroleum ether [2] | 3.5 | 39.2 | 80.1 | 15.4 | 4.5 |

[1] A mixture of 40 parts by volume of toluene and 60 parts by volume of cyclohexane.
[2] A mixture of 40 parts by volume of toluene and 60 parts by volume of petroleum ether.

What is claimed is:

1. A method for polymerizing butadiene which comprises contacting butadiene in the presence of a hydrocarbon solvent with a catalyst consisting of a reaction mixture of a compound selected from the group consisting of iron, cobalt and nickel peroxides, containing more than 0.1 milligram equivalent of active oxygen per gram of said compound and a halide of aluminum.

2. A method according to claim 1 wherein the polymerization is effected at a temperature between 30° C. and 150° C.

3. A method according to claim 1 wherein the polymerization is effected in an inert atmosphere and 0.5 to 50 parts by volume of said hydrocarbon solvent per part of butadiene is used.

4. A method according to claim 2 wherein the temperature is 0°–100° C.

5. A method according to claim 1 wherein the halide of aluminum is $AlCl_3$, $AlBr_3$ or $AlI_3$.

6. A butadiene polymerization catalyst consisting of a reaction mixture of a compound selected from the group consisting of iron, cobalt and nickel peroxides containing more than 0.1 milligram equivalent of active oxygen per gram of said compound and a halide of aluminum.

7. A butadiene polymerization catalyst according to claim 6 wherein the halide of aluminum is $AlCl_3$, $AlBr_3$ or $AlI_3$.

References Cited

UNITED STATES PATENTS 3,313,792    4/1967    Duck et al. _____ 260—94.3

JOSEPH L. SCHOFER, Primary Examiner.

R. A. GAITHER, Assistant Examiner.